United States Patent
Moizio et al.

(10) Patent No.: US 6,415,237 B1
(45) Date of Patent: Jul. 2, 2002

(54) ELECTRONIC CORRECTION FOR ROTARY TRANSDUCER SPIN FREQUENCY NOISE

(75) Inventors: Frank J. Moizio; James C. Shouse, both of Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 66 days.

(21) Appl. No.: 09/684,527

(22) Filed: Oct. 6, 2000

Related U.S. Application Data

(60) Provisional application No. 60/159,074, filed on Oct. 12, 1999.

(51) Int. Cl.[7] .......................... G06F 19/00; G01D 18/00
(52) U.S. Cl. ..................... 702/104; 702/94; 702/106; 250/231.16; 250/231.18
(58) Field of Search ...................... 702/85, 90, 94–95, 702/104, 106, 112; 324/207.11, 207.12, 207.22, 207.25; 250/231.13, 231.14, 231.16, 231.17, 231.18, 233, 236; 341/3–4, 111, 120

(56) References Cited

U.S. PATENT DOCUMENTS

| | | | | |
|---|---|---|---|---|
| 4,524,347 A | * | 6/1985 | Rogers | 250/231.16 |
| 5,138,564 A | * | 8/1992 | De Jong et al. | 702/96 |
| 5,329,467 A | * | 7/1994 | Nagamune et al. | 702/159 |
| 5,796,250 A | * | 8/1998 | Dames | 324/207.22 |
| 5,933,106 A | * | 8/1999 | He et al. | 341/116 |

* cited by examiner

Primary Examiner—Bryan Bui
(74) Attorney, Agent, or Firm—Charles A. Brill; Wade James Brady, III; Frederick J. Telecky, Jr.

(57) ABSTRACT

A method of correcting the output of a rotary displacement transducer so as to remove spin frequency noise error. For each revolution of the transducer, a series of transducer output values is accumulated. Each output value represents a time interval between transducer pulses. These output values are used to calculate sin and cosine values of a sin wave and cosine wave having a period determined by the transducer resolution. From the sin and cosine waves, a quadrature and an inphase value are obtained, and the latter values are used to calculate magnitude and phase values of a correction sin wave having the same transducer periodicity. The magnitude and phase values are used to calculate a correction value for each transducer output value.

18 Claims, 5 Drawing Sheets

ELECTRONIC CORRECTION FOR ROTARY TRANSDUCER SPIN FREQUENCY NOISE

This application claims priority under 35 USC § 119(e)(1) of provisional application Ser. No. 60/159,074 filed Oct. 12, 1999.

TECHNICAL FIELD OF THE INVENTION

This invention relates to displacement transducers, and more particularly to a method for correcting spin frequency noise errors associated with rotary transducers.

BACKGROUND OF THE INVENTION

Often, it is desired to locate or measure rotary motion. Various rotary displacement transducers have been developed to convert rotary information into an electrical signal.

One type of rotary displacement transducer is a rotary encoder. Rotary encoders, also referred to as angular encoders, sense rotary displacement, convert rotary information to an electric signal, and provide a digital output, which is processed to determine angular position.

Rotary displacement transducers are used in a wide variety of applications, generalized by the occurrence of some form of rotary motion. A rotary displacement transducer is used to locate and track the rotary position of that motion. An example of a common use of rotary displacement transducers is in connection with systems that use a rotary actuator. A rotary displacement transducer is often mounted to a motor to determine shaft position. Such transducers can also be mounted to positioning tables, screw drives, gearheads, machining tools, and the like.

A problem encountered in the use of rotary displacement transducers is spin frequency error. Manufacturing tolerances and mechanical mounting differences can cause the signal from the transducer to contain anomalies. Various filtering methods could be used, but introduce phase delay and fall short of isolating only the error component or components.

SUMMARY OF THE INVENTION

One aspect of the invention is a method of correcting spin frequency error in the output of a rotary displacement transducer. For each revolution of the transducer, a series of output values is stored, each output value representing a time interval between pulses of the transducer. An "inphase value" is calculated by multiplying each output value times a sin wave value, the sin wave having a period determined by the transducer resolution, and by calculating an average from the results of the multiplying step. A "quadrature value" is calculated by multiplying each output value times a cosine wave value, the cosine wave having a period determined by the transducer resolution, and by calculating an average from the results of the multiplying step. The inphase and quadrature values are used to calculate a magnitude and a phase value. The magnitude and phase values are then used to calculate a series of correction values, the correction values corresponding to points on a sin wave having a period determined by the transducer resolution and having a magnitude and phase equal to the magnitude and phase values. Each correction value is subtracted from a corresponding transducer output value, thereby providing corrected transducer output values. The process is repeated for each revolution of the transducer.

An advantage of the invention is that the error correction is automatic and continuous. It removes once-per-revolution error, and any or all periodic noise components, such as a twice-per-revolution noise component, electronically and in pseudo real time. The correction process does not compromise the integrity of the measurement data provided by the transducer. In other words, there is no phase delay or magnitude coloring associated with the measurement data provided by the transducer; only the desired frequency component or frequency components of the output signal are removed and thereby affected.

DETAILED DESCRIPTION OF THE INVENTION

Example of Transducer Applications

Figure 1:
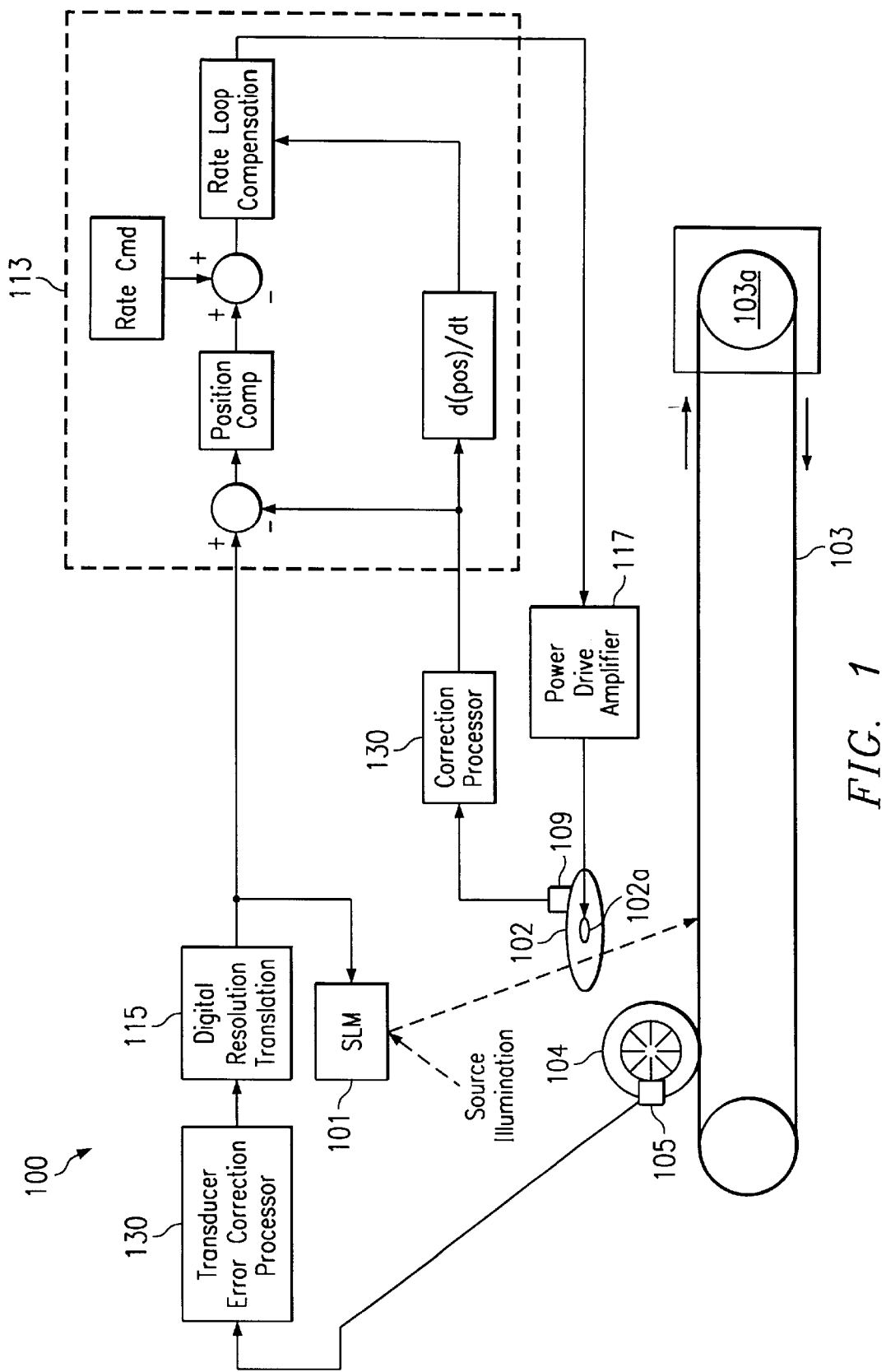
FIG. 1 is a block diagram of a photofinishing system, having two different rotary displacement transducers, and having two spin frequency error correction processors in accordance with the invention.

FIG. 1 illustrates a portion of a photofinishing system 100, which has two applications of a rotary displacement transducer. Central to the operation of photofinishing system 100 is the use of a spatial light modulator (SLM) 101 to create images. An example of a suitable SLM 101 is a digital micro-mirror device (DMD), which is an array of tiny micromirrors, each of which is individually addressable with an electronic signal to go to an off or on state. Each mirror creates a pixel element of the image. The DMD-type SLM 101 is illuminated by white light, and the on or off state determines whether a given mirror (pixel element) of the image will be dark or light. Various modulation techniques are used to vary the intensity of each pixel element. Other types of SLM's could be used.

As explained below, a color wheel 102 is used to color the images. The images are used to expose a photosensitive media (such as photographic paper) carried on a transport belt 103. A series of different still images illuminates a series of different photographic negatives.

A transducer is used in each of two subsystems of photofinishing system 100: a color wheel subsystem and a digital resolution translator (DRT) subsystem. However, as indicated in the Background, rotary displacement transducers have a vast variety of applications, and the principles described herein can be used for rotary displacement transducers in any application. In the example of FIG. 1, both rotary displacement transducers are encoders, providing a digital output.

The color wheel 102 is a rotating wheel, driven by a motor 102a and having segments with differently colored filters. In the example of FIG. 1, the segments are red, green, and blue. Each image generated by the display device 101 passes through the color wheel 102 as the color wheel 102 rotates. Thus, at any given time, the position of the color wheel 102 determines the color of the image. The color wheel motor 102a is synchronized to the display device 101, so that as new images are generated, each is filtered with a desired color. A combination of differently colored images results in a full color picture having all color components.

A color wheel transducer 109 translates the motion of the color wheel 102 into digital data that is used to control the operation of the color wheel 102. As illustrated, the color wheel transducer 109 delivers transducer data to a processor 130 that removes the spin frequency error. The corrected transducer data is delivered to closed loop feedback system 113, used to control the color wheel motor 102a via a power drive amplifier 117.

The transport system has a transport belt 103, which carries the photosensitive media past each new image generated by the SLM 101. The transport belt 103 is driven by a motor 103a. Code wheel 104 translates the motion of the belt 103 into rotary motion, and code wheel transducer 105 translates the code wheel motion into digital information. This digital information is corrected by removing the spin frequency error with processor 130 and further processed by a digital resolution translator 115, so as to provide digital resolution transport (DRT) data to an image control system associated with SLM 101. The correction processor 130 and translator 115 could be interchanged, that is, either could be performed before the other.

For both the feedback loop of the color wheel subsystem and the control circuitry of the transport subsystem, it is important to have accurate transducer output. Significant to the invention is the use of a correction processor 130 to remove spin frequency error in the output of the transducers 105 and 109. Two processors 130 are illustrated in FIG. 1, one for each transducer 105 and 109. In other embodiments, a single processor could perform the correction for the output of both transducers.

Transducer Spin Frequency Error Correction

The signal emanating from transducers 105 and 109 is a complex time series waveform containing spectral position data. The waveform contains spin frequency error components. An example of spin frequency error is often referred to as "eccentricity" error.

When a rotary displacement transducer is spinning at a constant speed, spin frequency error manifests itself as a noise component at the spin frequency and at potential harmonics of the fundamental spin frequency. Thus, a fundamental component occurs at one revolution per second. Harmonic noise components occur at two, three, four, etc., revolutions per second. The methods described herein can be used to remove these noise components.

For purposes of the invention, it is assumed that the once-per-revolution component of spin frequency noise is due to mechanical spin frequency inherent in the transducer 104 and not due to speed error. The once-per-revolution error is at a single sinusoidal frequency with a specific magnitude and phase that can be extracted from the complex waveform. The phase of this sinusoidal frequency is substantially repeatable from print to print (or more specifically, transducer revolution to revolution). The phase is also assumed to be independent of the speed of the transducer. The magnitude is less repeatable from revolution to revolution, due to variation of contact pressure, i.e., pressure from the measurement surface coupling to the transducer. This force variation affects the magnitude of the sinusoidal term. Mechanical design and proper mounting of the transducer can minimize this variation by attempting to achieve constant force between the transducer and the measurement surface.

In the case of a DMD display device 101, rotary displacement transducer spin frequency noise manifests as accumulated error across the rows of mirrors. The error contributes to an undesired "row banding" effect.

As indicated in FIG. 1, an error correction processor 130 removes error resulting from the spin frequency noise of the rotary displacement transducer. In general, it measures the transducer spin frequency on a continuous basis. It computes the magnitude and phase of the spin frequency error for each revolution of the transducer, and applies an alpha filtered average phase and magnitude correction. Processor 130 may be implemented with any general purpose processor, and is assumed to have input means, memory, and calculation circuitry for performing the method described herein.

Figure 2:
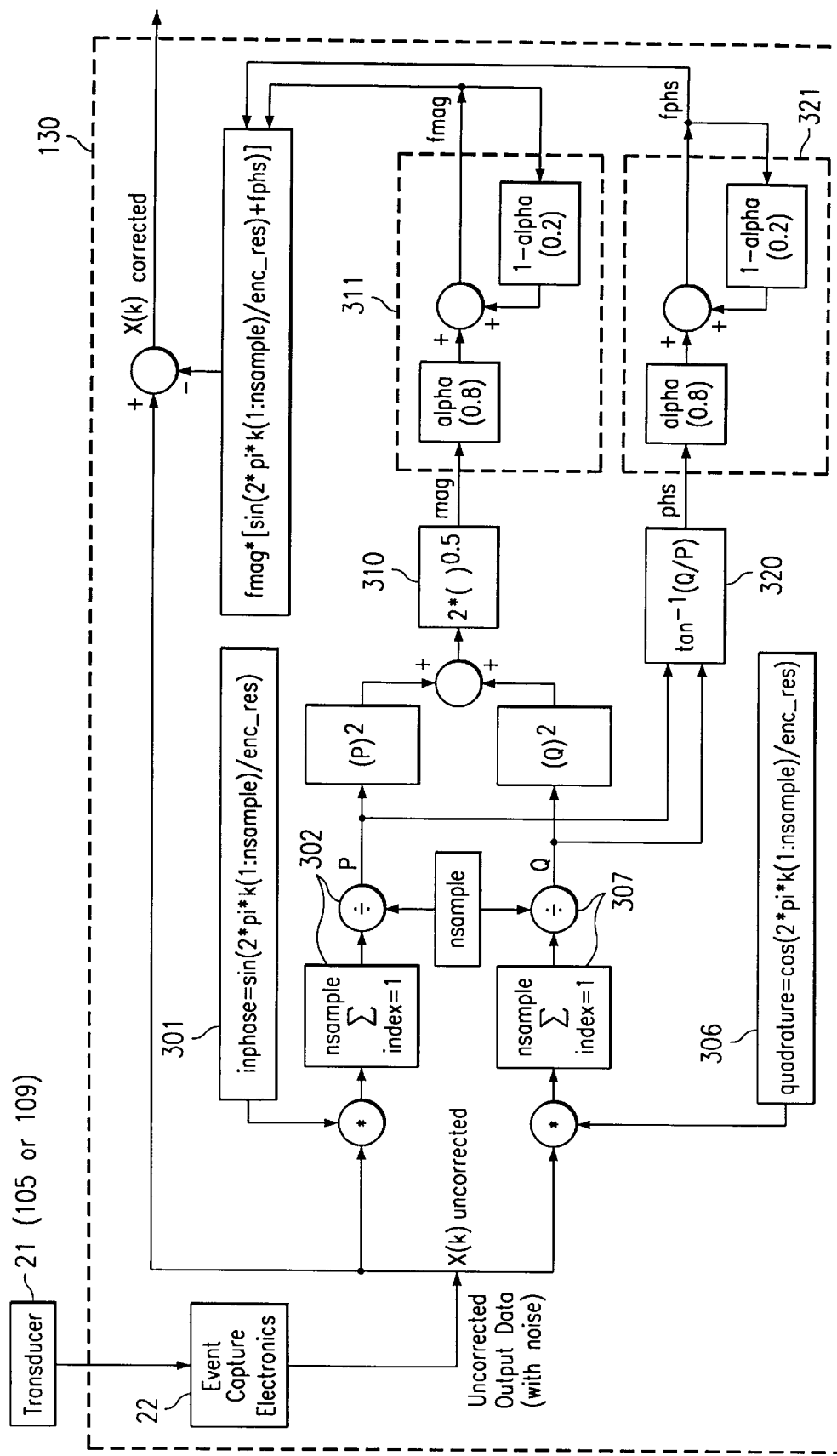
FIG. 2 illustrates the error correction processor of FIG. 1, the processor operable to remove the fundamental spin frequency error.

FIG. 2 illustrates a rotary displacement transducer 21 and either of the transducer error correction processors 130 of FIG. 1. Transducer 21 may be either of the transducers 105 or 109 in FIG. 1. However, as stated above, the discussion herein of these two types of application-specific transducers is for purposes of example, and the output of any type of rotary displacement transducer 21 may be corrected with processor 130.

Depending on the application of transducer 21, its output signal may undergo some type of front end processing by transducer event capture electronics 22. This front-end processing may vary depending on the application, and may be implemented with dedicated circuitry or with programming of processor 130 in addition to that used for spin frequency error correction. With or without front end processing, the transducer output data, X(k), is assumed to have the spin frequency error described above.

Processor 130 may be any general purpose processor, or one especially designed to carry out the functions described herein. The process flow diagram within processor 130 illustrates the programming performed by processor 130 for spin frequency error correction.

Rotary displacement transducer 21 has a certain number of pulses (output values) per revolution. This transducer resolution is referred to herein as "enc_res". For purposes of example herein, enc_res=48. Thus, for each revolution, the transducer provides a set of 48 output values, X(k), where k=1, 2, 3 , . . . 48. Each kth value represents a time interval between pulses.

Figure 3:
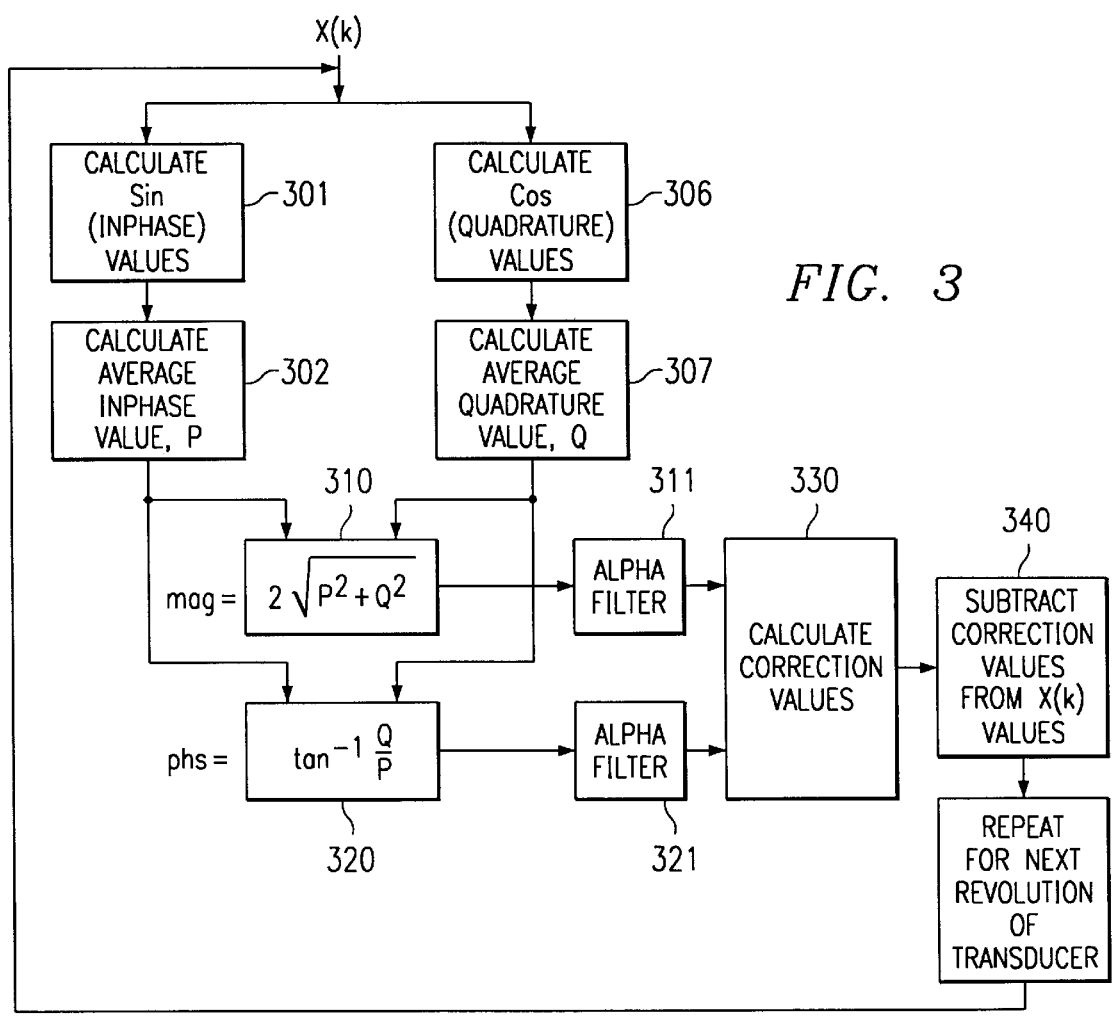
FIG. 3 illustrates the steps of the error correction process for removal of the fundamental spin frequency error component.

FIG. 3 illustrates the same processing illustrated in FIG. 2, as performed by processor 130. The process steps of FIG. 3 are identified in FIG. 2 with functional blocks that may be implemented with electronic circuitry and/or programming. The steps of FIG. 3 are repeated for each revolution. That is, new correction values are calculated and applied for each revolution of the transducer.

In the example of FIGS. 2 and 3, the algorithm is directed to removal of spin frequency error at the fundamental frequency. Additional processing for harmonics of the error signal is described below in connection with FIGS. 5 and 6.

Referring to both FIGS. 2 and 3, the initial error correction processing of X(k) is divided into two paths, so as to obtain two intermediate values, P and Q, which are an inphase and a quadrature value, respectively, of X(k) at the transducer frequency.

Step 301, for the inphase value path, each value of X(k) is multiplied times a corresponding sin value to create a sin wave. Using the 48 pulses per revolution example of this description, each sin value is calculated as follows:

inphase=sin(2*pi*k(1:48)/48)

, where 1:48 represents iterations from 1 to 48. For example, the first sample value of X(k) would be multiplied times sin(2*pi*1/48). The last value (for one revolution) would be multiplied times sin(2*pi*48/48), which is the same as sin(2*pi). Thus, the product of each X(k) value and each sin value results in a new set of 48 values, representing a sin wave with 48 points.

In Step 302, an average sin wave value is obtained by summing the sin wave values from 1 to nsample (48) and dividing by nsample (48). The result is an in phase average value, P.

Steps 306 and 307 are analogous to Steps 301 and 302. In Step 306, for the fphs path, each X(k) is multiplied times a cos value to create 48 cosine values. The calculation is similar to that used for Step 301, except that a cos factor is used. In Step 307, a quadrature average value, Q, is calculated.

The P and Q values are inphase and quadrature values of a sin wave whose period coincides with one revolution of the transducer. A feature of the invention is the use of the transducer resolution (counts per revolution) to determine the period of the sin wave. In the example of this description, after 48 transducer pulses, it can be assumed that the transducer has undergone one revolution. As explained below, the calculations of FIGS. 2 and 3 determine the magnitude and phase of this sin wave. This sin wave represents an spin frequency error component of the transducer output. Once known, this component of the signal can be removed from the output signal.

In Step 310, a sum of squares, $P^2+Q^2$ is calculated, the square root taken, and the result multiplied times 2. The result is a magnitude correction value, mag. In Step 311, the output of Step 310 is filtered, to provide a filtered magnitude correction value, fmag.

In Step 320, the inverse tangent of Q/P is calculated. The result is a phase correction value, phs. In Step 321, the output is filtered, to provide a filtered phase correction value, fphs.

The filtering of Steps 311 and 321 is used to smooth error correction application following processing on a revolution to revolution basis. In the example of FIG. 2, the current value is weighted by 0.8 and the previous value is weighted by 0.2, but other weighting values could be used. Additional previous values could be used. The filtering smooths changes from one revolution to the next. The filtering may be implemented with low pass filters, such as alpha filters or bilinear transform low pass filters.

After Steps 311 and 321, for each revolution, a single fmag value and a single fphs value are calculated. Once these values are known, they can be used to create a sin wave, which closely represents the frequency of the spin frequency noise with the correct magnitude and phase relationship. Computation of this sin wave yields "correction values", to be subtracted from the transducer output.

Step 330 uses the fmag and fphs values to create these correction values. Each correction value, CV, is calculated as follows:

CV=fmag[sin(2* pi * k(1:48)/48 +fphs)]

Thus, for each revolution, there are 48 correction values, one for each value of X(k).

In Step 340, each correction value is subtracted from the corresponding value of X(k). The result is the corrected transducer output, a new series of 48 corrected values.

In the example of this description, the application of the correction has a one revolution delay due to processing restrictions. In other words, during a first revolution, correction values are calculated, and during a next revolution, these correction values are applied. If efforts are made to provide a constant surface pressure in the transducer mounting, changes to the phase and magnitude of the error are sufficiently slow such that this delay is acceptable.

Figure 4A:
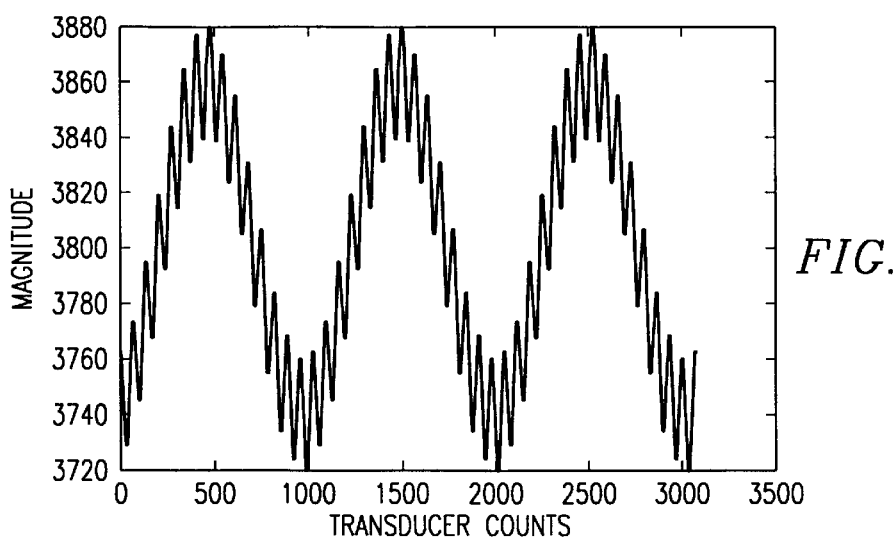
FIGS. 4A, 4B, and 4C illustrate uncorrected transducer output, the error component of the transducer output, and the corrected transducer output, respectively.
Figure 4B:
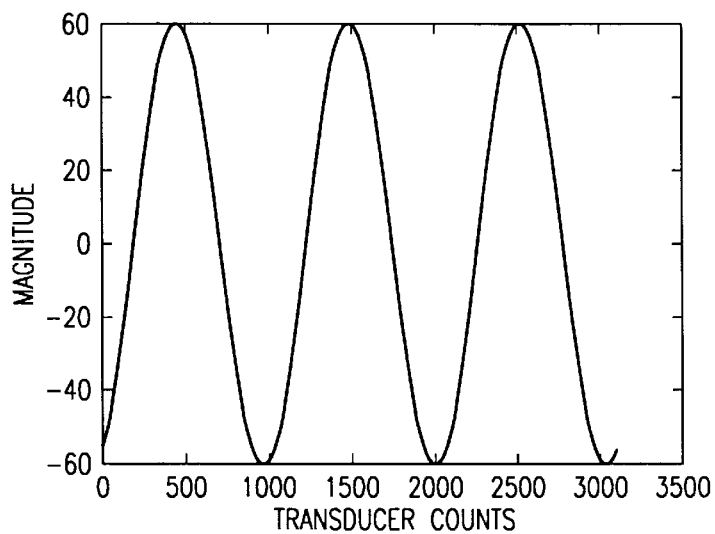
Figure 4C:
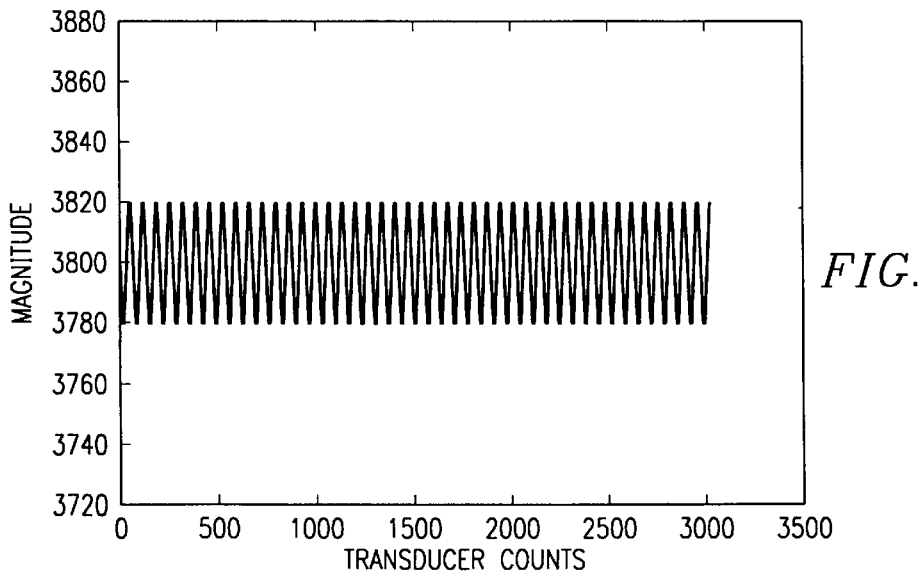

FIGS. 4A–4C illustrate the transducer output, the error signal at the fundamental frequency, and the corrected output signal, respectively. As illustrated in FIG. 4B, the error signal at the fundamental frequency is a sin wave. In the example of FIG. 4, the transducer provides 1000 counts (output values) every revolution. Thus, every new set of 1000 counts represents a new period of the sin wave. The method illustrated in FIGS. 2 and 3 calculates a magnitude, phase, and frequency waveform shown in FIG. 4B from the waveform shown in FIG. 4A.

Harmonics of the Fundamental Error Signal

To remove harmonics of the fundamental error signal, the process is repeated for multiples of the transducer frequency. In Steps 301 and 306, an additional factor, h, is used as a multiplier, where h is the harmonic number. Thus, for example, for the second harmonic, h=2, and each sin wave value would be calculated as:

inphase=sin(2 * 2*pi*k(1:48)/48)

Similarly, the cosine wave would have an additional factor of 2, and the CV equation, described above, would have an additional factor of 2. It would be expressed as follows:

CV=fmag[sin(2 * 2* pi * k(1:48)/48+fphs)]

Figure 5:
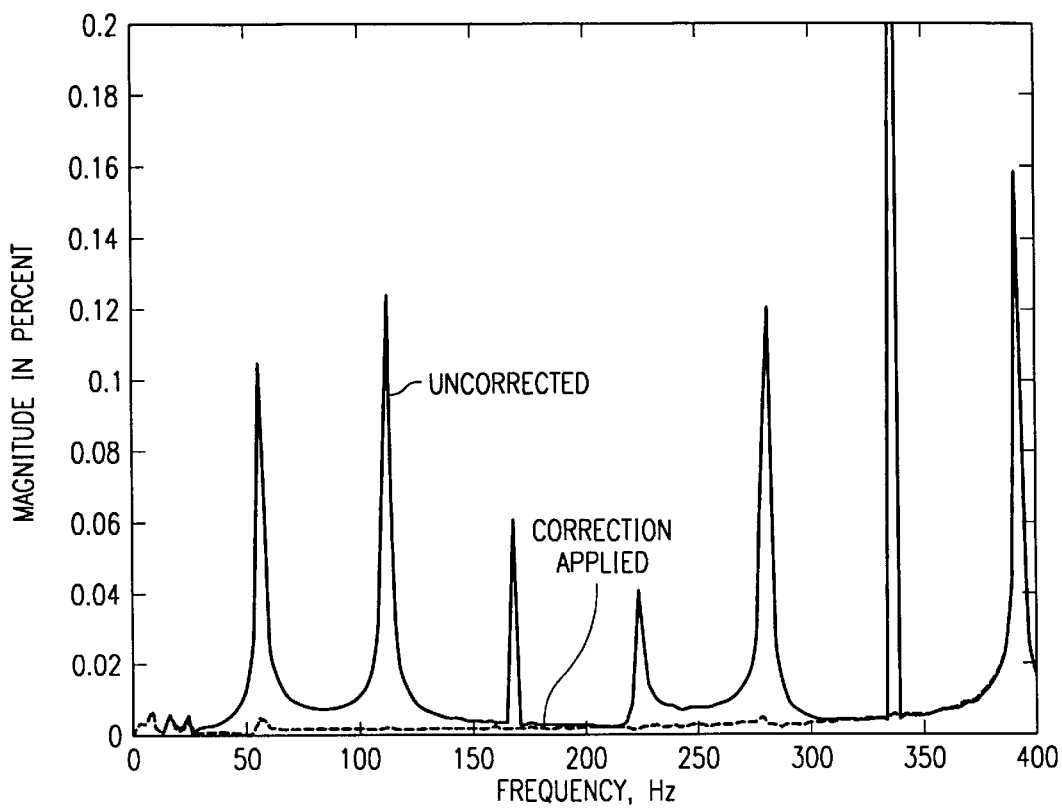
FIG. 5 illustrates the uncorrected and corrected spectral frequency responses of a transducer with several periodic artifacts.

FIG. 5 illustrates the frequency response of a rotary displacement transducer having a spin frequency of 57 revolutions per second. As illustrated, an uncorrected frequency response contains a 57 Hz error component. The above-described method calculates values representing this error, which when subtracted from the transducer output values, results in corrected data.

Figure 6:
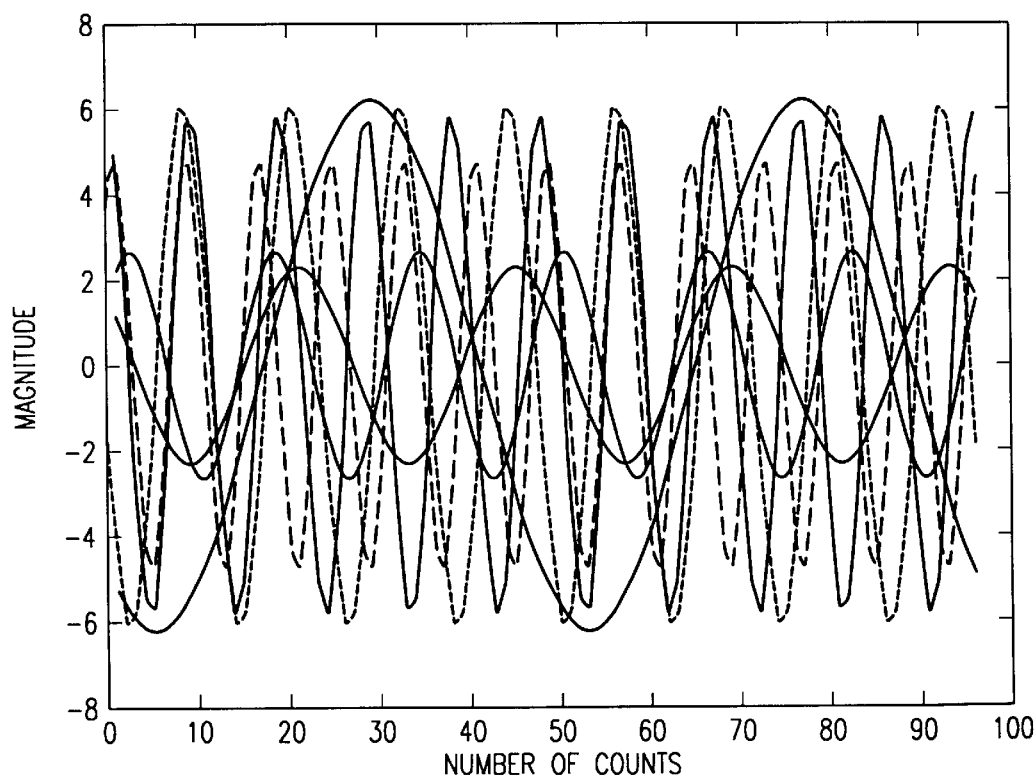
FIG. 6 illustrates the time domain response fundamental error component and the first five periodic artifacts related to the transducer measurement output of FIG. 5.

FIG. 6 illustrates the fundamental component and the first five harmonics of the error component of FIG. 5. As discussed above, a error value can be calculated for each of the harmonics as well as for the fundamental error frequency.

Other Embodiments

Although the present invention has been described in detail, it should be understood that various changes, substitutions, and alterations can be made hereto without departing from the spirit and scope of the invention as defined by the appended claims.

What is claimed is:

1. A method of correcting spin frequency noise error in the output of a rotary displacement transducer having a known resolution, comprising the steps of:

for each revolution of the transducer, storing a series of output values, each output value representing a time interval between pulses of the transducer;

calculating an inphase value by multiplying each output value times a sin wave value, the sin wave having a period determined by the transducer resolution, and by calculating an average from the results of the multiplying step;

calculating a quadrature value by multiplying each output value times a cosine wave value, the cosine wave having a period determined by the transducer resolution, and by calculating an average from the results of the multiplying step;

calculating a magnitude and a phase value from the inphase and quadrature values;

calculating a series of correction values, the correction values corresponding to points on a sin wave having a period determined by the transducer resolution and having a magnitude and phase equal to the magnitude and phase values;

subtracting each correction value from a corresponding transducer output value, thereby providing corrected transducer output values; and repeating the above steps for a next revolution of the transducer.

2. The method of claim 1, further comprising the step of filtering the magnitude and phase values.

3. The method of claim 2, wherein the filtering step is performed with a filter that smooths the effect of delay between calculation and application of the correction values.

4. The method of claim 1, wherein the magnitude value is calculated by summing the squares of the inphase and quadrature values, calculating the square root of the sum, and multiplying times a factor of two.

5. The method of claim 1, wherein the phase value is calculated by calculating the inverse tangent of the quotient of the quadrature value and inphase value.

6. The method of claim 1, wherein the steps of calculating an inphase value and a quadrature value are further performed by multiplying the sin wave value and cosine wave value times a harmonic number.

7. The method of claim 1, further comprising the step of delivering the corrected transducer output to a control system.

8. The method of claim 1, wherein the correction values are subtracted from output values that are delayed by one revolution of the transducer.

9. The method of claim 1, wherein the transducer is a rotary encoder.

10. The method of claim 1, wherein the spin frequency noise error is eccentricity error.

11. A processor for removing spin frequency error in the output of a rotary displacement transducer having a known resolution, comprising:

memory for storing, for each revolution of the transducer, a series of output values, each output value representing a time interval between pulses of the transducer;

processing circuitry for calculating an inphase value by multiplying each output value times a sin wave value, the sin wave having a period determined by the transducer resolution, and by calculating an average from the results of the multiplying step; calculating a quadrature value by multiplying each output value times a cosine wave value, the cosine wave having a period determined by the transducer resolution, and by calculating an average from the results of the multiplying step; calculating a magnitude and a phase value from the inphase and quadrature values; calculating a series of correction values, the correction values corresponding to points on a sin wave having a period determined by the transducer resolution and having a magnitude and phase equal to the magnitude and phase values; and subtracting each correction value from a corresponding transducer output value.

12. The processor of claim 11, wherein the processing circuitry further filters the magnitude and phase values.

13. The processor of claim 12, wherein the filtering is performed with a filter that smooths the effect of delay between calculation and application of the correction values.

14. The processor of claim 11, wherein the processing circuitry calculates the magnitude value by summing the squares of the inphase and quadrature values, calculating the square root of the sum, and multiplying times a factor of two.

15. The processor of claim 11, wherein the processing circuitry calculates the phase value by calculating the inverse tangent of the quotient of the quadrature value and inphase value.

16. The processor of claim 11, wherein the processing circuitry calculates the inphase value and the quadrature value by multiplying the sin wave value and cosine wave value times a harmonic number.

17. The processor of claim 11, wherein the processing circuitry subtracts correction values from output values that are delayed by one revolution of the transducer.

18. The processor of claim 11, wherein the spin frequency noise error is eccentricity error.

* * * * *